(No Model.)

E. G. McCLURE.
TORPEDO REEL.

No. 246,402. Patented Aug. 30, 1881.

Witnesses.
D. S. Lewis
Sm Reid

Inventor.
E. G. McClure
per Hallock and Hallock
Attys

UNITED STATES PATENT OFFICE.

ERNEST G. McCLURE, OF KENDALL CREEK, PENNSYLVANIA.

TORPEDO-REEL.

SPECIFICATION forming part of Letters Patent No. 246,402, dated August 30, 1881.

Application filed April 18, 1881. (No model.)

*To all whom it may concern:*

Be it known that I, ERNEST G. MCCLURE, of Kendall Creek, McKean county, Pennsylvania, have invented new and useful Improvements in Torpedo-Reels; and I do hereby declare that the following is a full, clear, and exact description thereof, reference being had to the accompanying drawings, and the letters or figures of reference marked thereon.
My invention relates to torpedo-reels. The reels in common use for lowering torpedoes in wells are journaled in a very ordinary manner—that is, the shaft of the spool is made hollow and fits closely upon a round shaft which acts as a bearing for the spool. This form is defective, for the reason that the shaft becomes very much worn and the spool becomes very unsteady. If this form of reel be used, after it has become worn the torpedo is apt to be discharged before it reaches the bottom, and thus work an irreparable injury to the well. The means also for controlling the speed of the descent are defective, the ordinary brake being used, which is uncertain in its effect and never has the spool entirely under control, the operator being compelled, during the descent, to hold the crank of the spool in addition to the handle of the brake.

Figure 1:
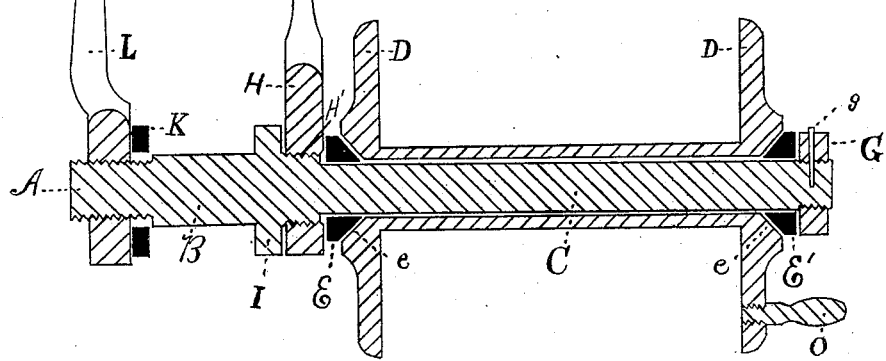
Figure 2:
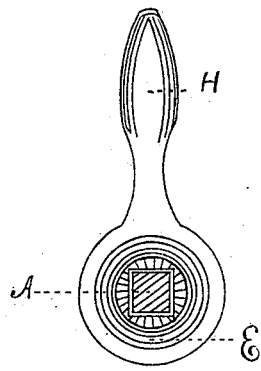

To remedy these defects is the object of my invention; and to that end it consists of means which will hereinafter be described, whereby the wear which ruins the shaft is avoided, and a new and novel means for controlling the speed of the falling torpedo.
In the drawings, Figure 1 represents a longitudinal vertical section of my device, and Fig. 2 a section of the square part C of the shaft, showing the conical bearing E and brake H.
A represents the shaft, having squared part C, which passes through the spool; D, the spool, having handle O and inwardly-projecting bearing-faces e e'; E E', the conical bearings; G, the nut for holding the spool and conical bearing-pieces upon the shaft; H, the brake; B, the cylindrical part of the shaft, which is inserted in the pin-hole of the crank; I, a collar for preventing the shaft from passing in too far; K, a washer, and L a clamp.
The squared part C of the shaft A has conical bearing-pieces E E', which fit snugly upon the shaft. Enough space, however, is left between the bearings to allow them to be moved longitudinally upon the shaft. These conical bearing-pieces fit within, or partly within, the heads of the spool, which is provided with conical depressions e e', that act as bearing-faces for pieces E E'.

The object in making the bearings E E' conical is to form a bearing-surface which can be readily adjusted to the wear of the spool by pressing the bearings together by means of the brake H.

When the bearings have been worn down so small that the bearing parts upon the spool will no longer take hold, it is obvious that new bearing-pieces can be substituted therefor at very little expense, as the supporting-shaft will not be in the least worn.

I do not limit myself in using these bearings to the device shown, as it is evident that they can be used in any device where a body revolves upon a shaft.

At suitable points upon shaft A are formed screw-threads, to which are screwed a brake, H, and nut G. The brake is attached upon the shaft near the bearing E, which is ordinarily in contact with one of its sides, and is forced against the spool whenever the brake is turned toward it. By this operation the spool is forced against bearing-piece E', which is prevented from moving by nut G. To prevent the latter from turning, a pin, g, is inserted in the nut and shaft, as shown, or it may pass entirely through both. The object of this brake, in addition to taking up the wear upon the bearings, is to regulate the speed of the descending torpedo. This is done by forcing the bearings together, as above stated, and the speed of the revolving spool may be impeded or stopped, if desired; or by turning the brake in the opposite direction the pressure will be removed from the bearings and the spool left to turn without a check.

When in use the device is suspended by means of the bearings B, which are inserted through the pin-hole of a crank upon a band-wheel, and are held in position by the collar I and clamp and washer L K.

The operation is as follows: The reel having its spool wrapped with twine or a torpedo-line is attached to a band-wheel crank. To the free end of the line is attached a torpedo, which is inserted in the well. To allow the line to run easily down the well a pulley-wheel is attached to the mouth of the latter and the line passed over it. The spool during the above operations is prevented from turning by the brake, which is screwed tightly against the bearing E. The torpedo is now ready to be lowered. The pressure of the brake upon the bearing is reduced and the spool left free to turn by the weight of the torpedo, which will begin to descend the moment the spool is free to revolve. It is here that the brake shows its usefulness, as the rapidity of descent can be increased by simply taking the pressure from the bearing-pieces, or the speed can be partly reduced or wholly stopped by screwing the brake against the bearing-piece E. After the torpedo has exploded the pressure upon the bearings may be entirely removed and the line rewound upon the reel without interference from the brake.

I am aware that it is not new to provide squared shafts with removable conical bearings. I am also aware that it is not new to attach movable bearings to a cylindrical shaft and so arrange them that a brake working upon the shaft will tighten them against a body resting thereon. This, however, differs from mine, in that one of its bearings is moved longitudinally by turning it upon a screw-thread, and the other is attached to the shaft by means of a key, which, when loosened, allows the bearing to be moved longitudinally upon the shaft. In my device the bearings are placed upon a square shaft and held in position, one by means of the brake and the other by a collar and key, which, when removed, permit the bearings and spool to be removed by simply tilting the shaft. I also make that part of the shaft between the inner bearing and the clamping device of a cylindrical instead of a square form. The brake is attached to this part of the shaft and works upon screw-threads formed upon the shaft. The object in placing the brake in this position is to allow the operator to stand immediately behind the reel and control the brake with his left hand and the handle on the spool with his right, if for any reason it becomes necessary to raise the torpedo.

I am also aware that it is not new to provide a torpedo-reel with a clamping device, and to that *per se* I make no claim. Furthermore, if it be desired to take the body off the shaft for any purpose, it will only be necessary to remove the collar and key at the end of the shaft, and the parts can be slid off without any difficulty. If the same object were attempted to be performed upon the devices above referred to, it would necessitate the tedious job of unscrewing one of the bearing-pieces before the body could be removed.

What I claim as new is—

In a torpedo-reel, a shaft having its outer half squared and its inner half rounded and screw-threaded, for the purposes set forth, in combination with removable conical bearings adapted to be slid longitudinally upon the squared portion of the shaft, a spool journaled upon said bearings and having a handle on the head opposite to the brake, a keyed collar upon the outer end of the shaft for holding the bearings and spools on the latter, a brake attached to the rounded half of the shaft for the purpose described, and a device for clamping the whole to a crank, substantially in the manner described, and for the purpose set forth.

In testimony that I claim the foregoing I have hereunto set my hand this 13th day of April, 1881.

ERNEST G. McCLURE.

Witnesses:
M. F. HALLECK,
O. H. COLTON.